United States Patent [19]

Tame

[11] Patent Number: 5,104,191

[45] Date of Patent: Apr. 14, 1992

[54] ARTICULATED TORSION ARM REST FOR A VEHICLE SEAT ASSEMBLY

[75] Inventor: Omar D. Tame, West Bloomfield, Mich.

[73] Assignee: Hoover Universal, Inc., Plymouth, Mich.

[21] Appl. No.: 662,472

[22] Filed: Feb. 28, 1991

[51] Int. Cl.⁵ ............................................. A47C 7/54
[52] U.S. Cl. ................................... 297/417; 297/113
[58] Field of Search ............... 297/417, 416, 411, 359, 297/113, 115, 117, 40, 78

[56] References Cited

U.S. PATENT DOCUMENTS

| | | | |
|---|---|---|---|
| 585,913 | 7/1897 | Haynes | 297/417 |
| 3,580,636 | 5/1971 | Setto | 297/417 |
| 4,141,586 | 2/1979 | Goldner et al. | |
| 4,159,145 | 6/1979 | Quakenbush | 297/417 |
| 4,586,750 | 5/1986 | Vogel | 297/417 |
| 4,913,264 | 4/1990 | Voves et al. | 248/425 X |
| 4,968,095 | 11/1990 | Moyer | 297/417 |

Primary Examiner—Kenneth J. Dorner
Assistant Examiner—James M. Gardner
Attorney, Agent, or Firm—Harness, Dickey & Pierce

[57] ABSTRACT

A seat assembly is disclosed with an arm rest which, when the arm rest is pivoted from a stowed position aligned with the seat back to a forwardly extending use position, the arm rest cushion is rotated 90° about the longitudinal axis enabling an arm rest cushion to present a relatively wide support surface in the use position but is rotated to occupy a narrower width of the seat back when in the raised stowed position.

11 Claims, 3 Drawing Sheets

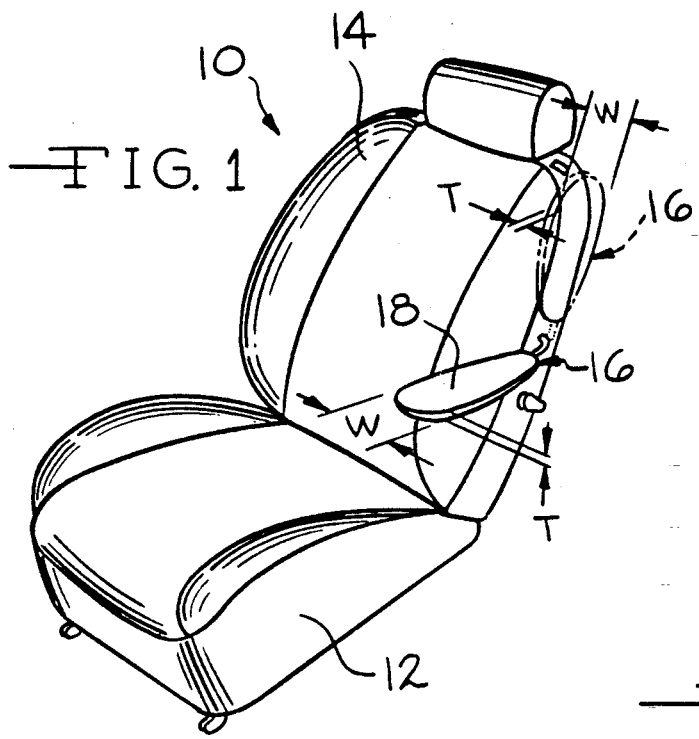
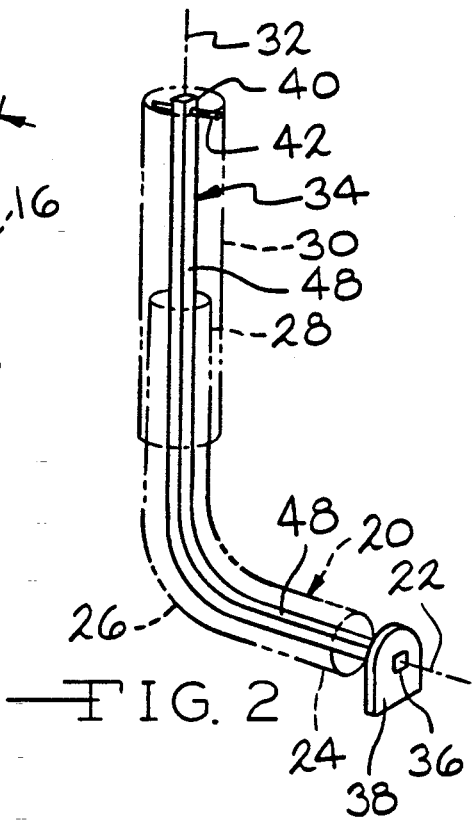
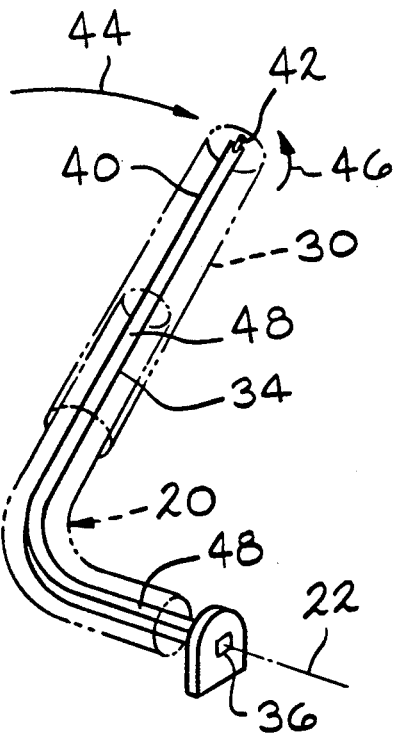
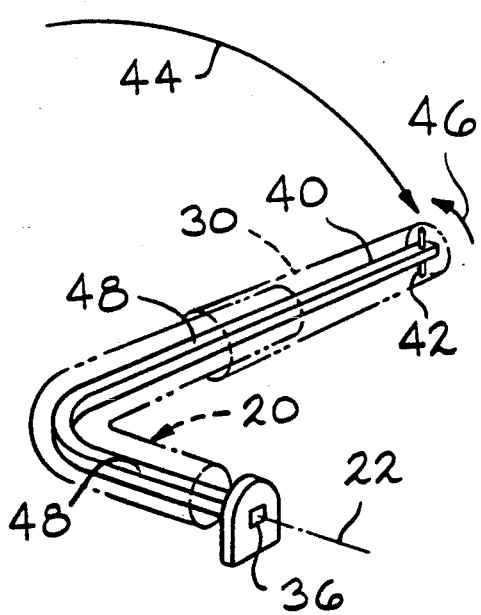

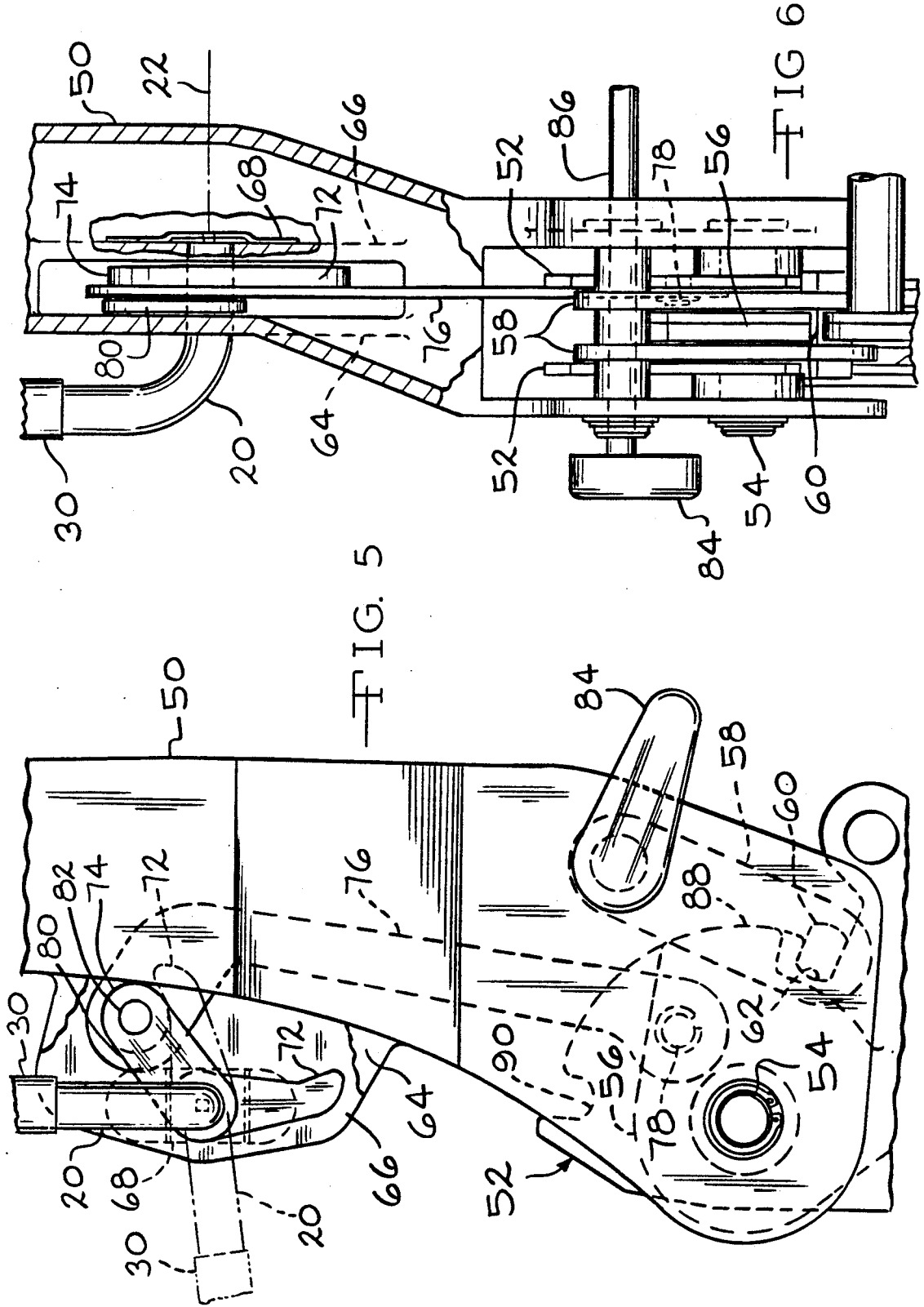

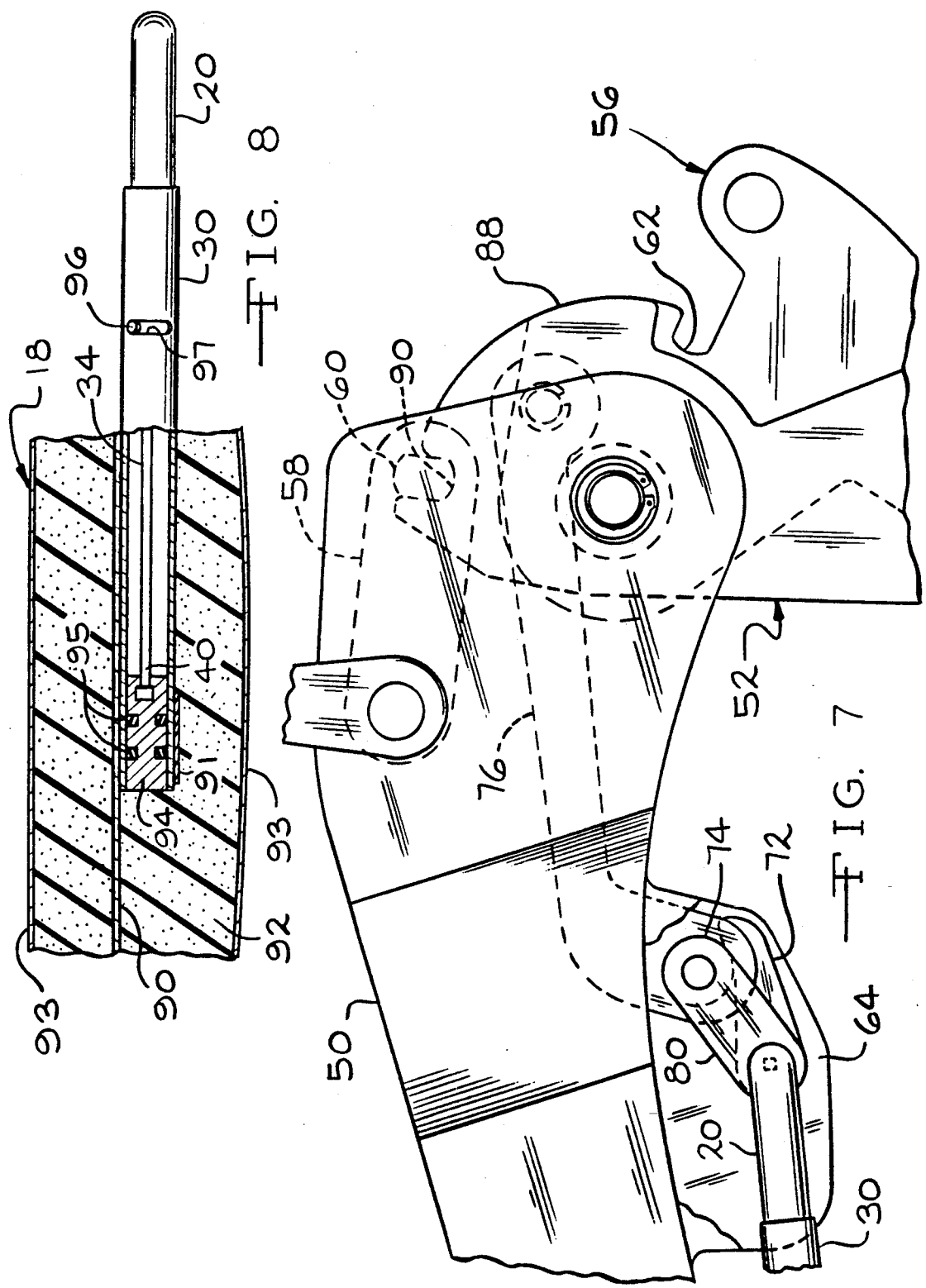

ARTICULATED TORSION ARM REST FOR A VEHICLE SEAT ASSEMBLY

BACKGROUND AND SUMMARY OF THE INVENTION

The present invention relates to an arm rest for a seat assembly and in particular to an articulating arm rest which, as it is rotated from a raised stowed position alongside the seat back to a forwardly extending use position, rotates about the longitudinal axis of the arm rest. The purpose of rotating the arm rest as it is pivoted from the stowed position to the use position is to provide an arm rest in the stowed position which has a lateral dimension that is relatively thin to minimize the seat back space occupied by the arm rest. When in the use position, however, the arm rest provides a suitably wide rest platform for the arm of the seat occupant.

In designing a motor vehicle, engineers are often faced with competing design objectives. One example is the need to reduce the size and weight of a motor vehicle while at the same time providing a vehicle which gives the occupant a spacious feeling common with larger vehicles. As the width of a vehicle decreases, the space available to provide occupant seats is also reduced. This directly competes with the desire to provide large comfortable seats for the occupant.

Accordingly, it is an object of the present invention to provide an arm rest for the vehicle seat assembly which provides a solution to the competing desires to reduce the width of a vehicle while maintaining the size of the vehicle seats.

The arm rest of the present invention accomplishes this objective by rotating about the longitudinal axis of the arm rest as the arm rest is being pivoted between an upright stowed position aligned with the seat back and a forwardly extending use position. By rotating about its axis, the arm rest in the stowed position provides a relatively narrow lateral profile along the width of the seat back, providing more room for the seat back structure and cushion. When the arm rest is pivoted to a forwardly extending use position, the arm rest rotates 90° about its longitudinal axis to provide a substantially wider use platform upon which the occupant can rest his/her arm.

The arm rest includes a pivot tube coupled to said seat back for pivotal motion to raise and lower the arm rest. One end of the pivot tube extends laterally from the seat back. The center portion of the pivot tube is bent approximately 90° so that the opposite end of the pivot tube extends upwardly when the arm rest is stowed and forwardly in the use position. A support tube is telescopically mounted to the pivot tube for rotation about the longitudinal axis of the support tube. A drive cable extends through the tubes with one end fixed to the seat back and the other end fixed to the support tube. Upon pivoting of the arm rest between the stowed and use positions, the drive cable rotationally drives the support tube about its axis to provide the necessary rotation.

The seat assembly further includes a four bar linkage mechanism coupled to the arm rest to define a stop for retaining the arm rest at a given angle in the use position regardless of the reclined position of the seat back.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a seat assembly containing the arm rest of the present invention;

FIGS. 2, 3 and 4 are perspective views of the arm rest cable drive illustrating its operation;

FIG. 5 is a side elevational view of the seat back structure and arm rest attachment;

FIG. 6 is a rear elevational view of the seat back and arm rest attachment as shown in FIG. 5;

FIG. 7 is a side elevational view showing the seat back rotated forward to a horizontal position; and FIG. 8 is a cross sectional view of the arm rest structure showing the cable drive coupling to the support tube.

DETAILED DESCRIPTION OF THE INVENTION

The seat assembly of the present invention having an articulating arm rest is shown in FIG. 1 and designated generally as 10. Seat assembly 10 includes a lower seat cushion 12 and a seat back 14 extending generally upwardly from the rear of the seat cushion. Arm rest 16 is pivotally coupled to the seat back to rotate between the forwardly extended use position shown in solid line and the raised stowed position in which the arm rest is aligned with the seat back shown in phantom line. While the arm rest 16 is shown along the left side of the seat back relative to a seat occupant, the invention is not limited to a left side arm rest or to a seat assembly having only a single arm rest.

Arm rest 16 includes a cushion 18 which has a width dimension "W" and a thickness dimension "T" shown in FIG. 1. In the forwardly extended use position, the thickness "T" is measured in the vertical direction while the width "W" is measured horizontally in the lateral direction across the seat assembly. The width "W" is several times greater than the thickness "T" and provides a wide surface for the seat occupant to rest his/her arm upon. To reduce the lateral dimension of the arm rest when it is raised to the stowed position, the arm rest rotates 90° about its longitudinal axis as it is pivoted upward to provide a lateral dimension along the seat back equal to the cushion thickness "T". As a result, the arm rest occupies a narrower position or presents a smaller profile along the seat back providing more space for the seat back 14 or other necessary components in a motor vehicle.

The cushion 18 is rotated by a cable drive mechanism contained within two tubes telescopingly coupled to one another for rotation. FIGS. 2, 3 and 4 schematically illustrate the cable drive mechanism of the arm rest. The arm rest includes a pivot tube 20 which is connected to the seat back 14 for pivotal action about the axis 22 defined by the proximal end portion 24 of the pivot tube. The center portion 26 of the pivot tube 20 includes a bend of approximately 90° in this embodiment but could be any other angle desired. The opposite distal end portion 28 is telescoped within a support tube 30 and coupled together for rotation about the axis 32 defined by the longitudinal length of support tube 30. A drive cable 34 extends through the support tube and pivot tube and is coupled at the proximal end 36 to the seat back in a manner that prevents rotation of the drive cable end 36. In FIGS. 2-4 the cable proximal end 36 is shown anchored by the tab 38.

The cable 34 is illustrated as a square wire cable for purposes of illustration only. The cable can be of any cross sectional shape. The opposite distal end 40 is shown having a pin 42 extending therethrough merely for purposes of illustrating the operation of the drive cable.

In FIG. 2 the mechanism is shown in the stowed position of the arm rest. As the arm rest is pivoted about axis 22 to the forward use position shown in FIG. 4, the distal end 40 of the drive cable will rotate in the direction of arrows 46 shown in FIGS. 3 and 4. The cable distal end 40 is coupled to the support tube so that rotation of the cable causes rotation of support tube 30 and consequently rotation of arm rest cushion 18. The rotation can be followed progressively in FIGS. 2, 3 and 4 by observing the flat surface 48 of the drive cable as the arm rest is pivoted. In FIG. 2 the surface 48 is the top surface of the horizontal cable portion and the inside or seat side of the cable along the vertical portion.

Since the proximal end 36 is fixed to prevent rotation, along the horizontal portion of the cable in FIGS. 3 and 4, the surface 48 will always remain the top surface. As the armrest is lowered, a torsional load is applied to the cable. However, since the cable distal end 40 is allowed to rotate, the end 40 rotates along with support tube 30 to relieve the torsional stress in the cable. The surface 48 remains the top surface along the entire length of the cable when the arm rest is in the extended use position as shown in FIG. 4. The intermediate position in FIG. 3 shows the cable distal end 40 partially rotated as the surface 48 moves from what was previously the inside position to the top position when the arm rest is in the use position.

The attachment of the arm rest to the seat back is shown in FIGS. 5 and 6. Seat back 14 includes an upright frame member 50 which is pivotally connected to the seat riser stanchion 52 about pivot 54 to provide for pivoting motion of the seat back relative to the seat cushion. A recliner arm 56 is also pivotally mounted to the riser stanchion 52 at pivot 54. A recliner mechanism, not shown, is operable to rotate the recliner arm 56 about pivot 54. The seat back frame 50 is coupled to the recliner arm by a link 58 and bolt 60 which is inserted into a recess 62 in the recliner arm. As the recliner arm rotates about pivot 54, the link and bolt will cause the seat back frame 50 to rotate about pivot 54 along with the recliner arm.

Arm rest 16 is mounted to the seat back frame 50 through a pair of spaced mounting walls 64 and 66 extending forwardly from the back frame 50. Pivot tube 20 is rotatably mounted to the walls 64 and 66 for rotation about the axis 22. A metal strap 68 is fastened to wall 66 and contains a square aperture 70 into which the proximal end 36 of the drive cable 34 is inserted. The strap 68 thus prevents rotation of the drive cable proximal end 36. Use of strap 68 with the square drive cable is one way of fixing the end 36 of the drive cable and is illustrative of the many possible ways of fixing the drive cable. It should be understood that the drive cable is not limited to a square cross section cable. All that is required is that the cable be capable of transmitting torque. One example of such a cable is a speedometer cable.

A stop mechanism is provided for holding the arm rest in the use position. The stop mechanism includes a finger 72 extending radially from axis 22 and fixedly coupled to the pivot tube 20 for rotation therewith. In the use position, the finger 72 contacts a stop 74 limiting further downward rotation of the arm rest. The stop 74 is carried by a four bar linkage mechanism so that the position of stop 74 varies as the seat back is reclined to maintain the arm rest at a constant angle relative to horizontal regardless of the angular position of the seat back. A link 76 is pivotally attached to the riser stanchion 52 about pivot 78. A floating link 80 is pivotally connected at one end to the link 76 at pivot 82 and connected at the other end to the pivot tube 20 for rotation about axis 22. The distance between pivots 54 and 78 is equal to the distance between pivot 82 and axis 22 such that upon rearward reclining of the seat back, the floating link 80 maintains a constant angular position relative to horizontal so that when the arm rest is in the use position and finger 72 contacts stop 74, the angular position of the arm rest also remains constant.

The seat back can be pivoted forward to a horizontal position for ease in storage of the seat when removed from the motor vehicle as shown in FIG. 7. This is accomplished by rotating the link 58 to remove bolt 60 from recess 62 by actuation of the lever 84 coupled to shaft 86 to which the link 58 is attached. Once the bolt is disengaged from the recess, the bolt can travel along the arcuate surface 88 of the riser stanchion 52 and recliner arm 56 as the seat back is pivoted forward. A second recess 90 is provided in the riser stanchion 52 for reception of the bolt 60 to lock the seat back in a horizontal position.

The four bar linkage which acts to hold the arm rest in a fixed position regardless of the reclined position of the seat back will also operate to maintain the position of the arm rest as the seat back is folded forward to a horizontal position as is shown in FIG. 7. This avoids the need to first manually raise the arm rest prior to folding the seat back forward.

FIG. 8 is a cross sectional view through the arm rest showing the connection of the drive cable 34 to the support tube 30. Arm rest cushion 18 comprises a metal support plate 90 fastened to support tube 30 by a strap 91. A foam body 92 is molded around the plate 90 and tube 30 and is covered by an upholstery 93. The end 40 of drive cable 34 is inserted into a cap 94 at the end of the tube 30. Drive cable 34 is anchored to the cap 94 so that the cap 94 will rotate along with the end of the drive cable.. The cap 94 is frictionally secured to the sufficiently tight fit so that the drive cable 34 can rotate the tube 30.

A set screw 96 coupled to the pivot tube 20 extends outwardly through a slot 97 cut in the side of support tube 30. The angular extent of slot 97 about the support tube is approximately 90° to limit rotation of the support tube 30 relative to pivot tube 20 to the 90° necessary to rotate the cushion 18 from its orientation in the stowed position to its orientation in the use position.

The O-rings 95, while providing a sufficiently tight fit to rotate the tube 30, also provide for some slippage between the cap 94 and tube 30. This is necessary since rotation of the support tube 30 is limited to 90° while the pivot tube 20 may pivot through an arc of more than 90° as the arm rest is moved between the stowed position and the use position. This is because the seat back is typically reclined rearward some extent from vertical. Since the drive cable 34 will tend to rotate tube 30 the same angular extent as the tube 20 is pivoted, which is greater than 90°, the connection of the cap 94 to the tube 20 provides for relative motion therebetween.

The arm rest of the present invention provides an easy and convenient means for providing a full size arm rest in the use position while decreasing the lateral extent of the seat back occupied by the arm rest when in the stowed position. This enables the seat back size to be maintained while the vehicle width is being decreased.

It is to be understood that the invention is not limited to the exact construction illustrated and described above, but that various changes and modifications may be made without departing from the spirit and scope of the invention as defined in the following claims.

I claim:

1. A seat assembly comprising:
    seat back
    an arm rest having an "L" shaped pivot member with a first proximal end portion, an intermediate bend portion and an elongated second distal end portion, said second distal end portion defining a longitudinal axis of the arm rest and a support member coupled to said second distal end portion for rotation about the longitudinal axis of the arm rest;
    means for coupling said pivot member first end portion to said seat back for pivotal motion of said arm rest between a stowed position in which said axis is substantially aligned with said seat back and a use position in which said axis is extending forwardly from said seat back; and
    means within said arm rest for torsionally rotating said support member about the longitudinal axis of said arm rest in response to pivotal motion of said arm rest between said stowed and use positions, said rotating means having a proximal end portion fixed to said seat back preventing rotation of said rotating means proximal end portion.

2. The set assembly of claim 1 wherein said support member rotates approximately ninety degrees about said longitudinal axis as said arm rest is pivoted between said stowed and use positions.

3. The seat assembly of claim 2 further comprising an arm rest cushion attached to said support member, said cushion having a width dimension substantially larger than a thickness dimension with said width dimension being generally horizontal and the thickness dimension being generally vertical when said arm rest is in said use position whereby upon pivoting of said arm rest to said stowed position, said cushion rotates approximately ninety degrees with said support member so that said cushion thickness dimension extends in a lateral direction across said seat back and said cushion width dimension extends fore and aft of said seat back when said arm rest is said stowed position in which said axis is aligned with said seat back.

4. The seat assembly of claim 1 further comprising:
    a lower seat frame to which said seat back is pivotally mounted whereby the angle of inclination of said seat back relative to horizontal is adjustable; and
    means coupled to said pivot member for maintaining said pivot member in a predetermined angular position relative to horizontal when said arm rest is in the use position regardless of the angle of inclination of said seat back.

5. The seat assembly of claim 4 wherein said means for maintaining said pivot member in said predetermined position includes a four bar linkage.

6. A seat assembly comprising:
    a lower seat cushion;
    a seat back extending upwardly at the rear of said seat cushion;
    an arm rest mounted to said seat back for pivotal motion of said arm rest between a stowed position substantially aligned with said set back and a use position extending forwardly from said seat back, said arm rest including a pivot member with a first proximal end portion having a first axis, a second distal end portion having a second axis and an intermediate bend portion between said end portions whereby said first and second axes are inclined relative to one another, said first proximal end portion being pivotally coupled to said seat back and said arm rest pivoting about said first axis as said arm rest moves between said stowed and use positions;
    said arm rest further including a support member coupled to said distal end portion of said pivot member and drive means within said arm rest for torsionally rotating said support member about said second axis as said arm rest is moved between said stowed and use positions, said drive means rotating said support member in one direction upon moving said arm rest to said use position and rotating said support member in the opposite direction upon moving said arm rest to said stowed position, said drive means having a proximal end portion fixed to said seat back preventing rotation of said drive means proximal end portion.

7. The arm rest of claim 6 wherein said pivot member and said support member are both hollow and said drive means includes a drive cable extending through said pivot and support members with a first proximal end of said cable being fixed to said seat back to prevent rotation of said first cable end and a second cable distal end attached to said support member whereby pivoting of said arm rest about said first axis causes the second end said cable to rotate and thereby rotate said support member.

8. The seat assembly of claim 7 further comprising stop means associated with said support and pivot members to limit the rotation of said support member relative to said pivot member to approximately 90°.

9. The seat assembly of claim 8 wherein the attachment of said second cable end to said support member is formed by a friction coupling with means for enabling said cable to slip relative to said support member after said stop means limits rotation of said support member during pivoting of said pivot member.

10. The seat assembly of claim 9 wherein said support member and pivot member are hollow cylindrical tubes with one of said members telescoped into the other of said members and frictionally held therein with said second cable end fixed to said plug.

11. The seat assembly of claim 7 wherein the first cable end has a square cross section and said first cable end is fixed to said seat back by inserting said first cable end into a square aperture in said seat back.

* * * * *

UNITED STATES PATENT AND TRADEMARK OFFICE
CERTIFICATE OF CORRECTION

PATENT NO. : 5,104,191
DATED : April 14, 1992
INVENTOR(S) : Omar D. Tame It is certified that error appears in the above-identified patent and that said Letters Patent is hereby corrected as shown below:

Column 6, Line 58, Claim 10, after "and", insert --further comprising a plug inserted into said support member and--.

Signed and Sealed this

Twenty-ninth Day of June, 1993

*Attest:*

MICHAEL K. KIRK

*Attesting Officer*     *Acting Commissioner of Patents and Trademarks*